(12) United States Patent
Zhang et al.

(10) Patent No.: US 8,619,591 B2
(45) Date of Patent: Dec. 31, 2013

(54) TRANSMISSION METHOD AND ASSEMBLING METHOD FOR PHYSICAL LAYER OPERATIONS, ADMINISTRATION AND MAINTENANCE (PLOAM) MESSAGE IN A PASSIVE OPTICAL NETWORK

(75) Inventors: Weiliang Zhang, Guangdong Province (CN); Dan Geng, Guangdong Province (CN); Marek Hajduczenia, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 167 days.

(21) Appl. No.: 13/258,572

(22) PCT Filed: Jun. 30, 2010

(86) PCT No.: PCT/CN2010/074759
§ 371 (c)(1),
(2), (4) Date: Jan. 6, 2012

(87) PCT Pub. No.: WO2011/017986
PCT Pub. Date: Feb. 17, 2011

(65) Prior Publication Data
US 2012/0128358 A1    May 24, 2012

(30) Foreign Application Priority Data

Aug. 10, 2009  (CN) .......................... 2009 1 0163674

(51) Int. Cl.
*H04L 1/00* (2006.01)
*H04J 3/24* (2006.01)
(52) U.S. Cl.
USPC ...................... 370/241.1; 370/236.2; 370/474
(58) Field of Classification Search
None
See application file for complete search history.

(56) References Cited

U.S. PATENT DOCUMENTS

| 2004/0202174 A1 | 10/2004 | Kim et al. |
| 2006/0120723 A1* | 6/2006 | Diouf et al. ..................... 398/71 |
| 2009/0016714 A1* | 1/2009 | Soto et al. ....................... 398/20 |

FOREIGN PATENT DOCUMENTS

| CN | 1726736 A | 1/2006 |
| CN | 1988696 A | 6/2007 |
| CN | 101047450 A | 10/2007 |
| CN | 101729937 A | 6/2010 |

OTHER PUBLICATIONS

International Search Report for PCT/CN2010/074759 dated Sep. 14, 2010.

* cited by examiner

*Primary Examiner* — Clemence Han
(74) *Attorney, Agent, or Firm* — Ling Wu; Stephen Yang; Ling and Yang Intellectual Property

(57) ABSTRACT

The present invention provides a transmission method for a physical layer operations, administration and maintenance (PLOAM) message in a passive optical network. The method includes: a transmitter dividing a PLOAM message to generate more than two new PLOAM messages, each of which comprises at least a message identification (Message ID) field (1501); and the transmitter transmitting the new PLOAM messages identified with Message IDs (1502). The invention also provides an assembling method for a PLOAM message in a passive optical network and a transmission device for a PLOAM message in a passive optical network. By using the method of the invention, the invention improves the efficiency of the PLOAM message transmission, avoids bandwidth waste, and simultaneously improves the flexibility and timeliness of the PLOAM message transmission between an OLT and an ONU.

22 Claims, 7 Drawing Sheets

| |
|---|
| ONU ID |
| Message ID |
| Data |
| CRC |
| ONU ID |
| Message ID |
| Data |
| CRC |
| ONU ID |
| Message ID |
| Data |
| CRC |
| ONU ID |
| Message ID |
| Data |
| CRC |

FIG.4

| |
|---|
| 11111111(The broadcast message for all the ONUs) |
| 00000011(Assigning ONU-ID) |
| Data (Assigning ONU ID1 to the ONU with a sequence number x) |
| CRC |
| 11111111(The broadcast message for all the ONUs) |
| 00000011(Assigning ONU-ID) |
| Data (Assigning ONU ID2 to the ONU with a sequence number y) |
| CRC |
| ONU-ID3 |
| 00000100 (Assigning an equalization time delay to the ONU whose ONU-ID is ONU-ID3) |
| Data (Equalization time delay value L1) |
| CRC |
| ONU-ID4 |
| 00000100 (Assigning an equalization time delay to the ONU whose ONU-ID is ONU-ID4) |
| Data (Equalization time delay value L2) |
| CRC |

FIG.5 (a)

| |
|---|
| ONU-ID1 |
| 00001101 (Key request) |
| CRC |
| ONU-ID2 |
| 00001101 (Key request) |
| CRC |
| ONU-ID3 |
| 00001101 (Key request) |
| CRC |
| ONU-ID4 |
| 00001101 (Key request) |
| CRC |

FIG.5 (b)

| |
|---|
| ONU ID |
| Message ID |
| Data |
| ONU ID |
| Message ID |
| Data |
| ONU ID |
| Message ID |
| Data |
| ONU ID |
| Message ID |
| Data |
| CRC |

FIG.6

| |
|---|
| 11111111(The broadcast message for all the ONUs) |
| 00000011(Assigning ONU-ID) |
| Data (Assigning ONU ID1 to the ONU with a sequence number x) |
| 11111111(The broadcast message for all the ONUs) |
| 00000011(Assigning ONU-ID) |
| Data (Assigning ONU ID2 to the ONU with a sequence number y) |
| ONU-ID3 |
| 00000100 (Assigning an equalization time delay to the ONU whose ONU-ID is ONU-ID3) |
| Data (Equalization time delay value L1) |
| ONU-ID4 |
| 00000100 (Assigning an equalization time delay to the ONU whose ONU-ID is ONU-ID4) |
| Data (Equalization time delay value L2) |
| CRC |

FIG.7

| |
|---|
| ONU ID |
| Message ID |
| Data |
| Message ID |
| Data |
| CRC |

FIG.8

| |
|---|
| ONU-ID1 |
| 00010010 (Interval of bit error rate) |
| Data (Interval values for bit error rate) |
| 00010000 (Change the light emitting optical power of the ONU) |
| Data (Control the light emitting optical power of the ONU to increase, decrease or remain unchanged) |
| CRC |

FIG.9

| 11111111 or ONU-ID1 (No ONU-ID assigned or ONU-ID1 is assigned to the ONU) |
|---|
| 10000011 (Indicating that the message type is "Serial_Number") |
| Data (Sequence number information) |
| CRC |
| 11111111 or ONU-ID1 (No ONU-ID assigned or ONU-ID1 is assigned to the ONU) |
| 10000001 (Indicating that the message type is "Random_Delay_ONU") |
| Data (Random time delay of the ONU when transmitting the sequence number) |
| CRC |
| 11111111 or ONU-ID1 (No ONU-ID assigned or ONU-ID1 is assigned to the ONU) |
| 10000000 (Indicating that the message type is "Power_Mode_ONU") |
| Data (Transmitting optical power level mode of the ONU) |
| CRC |

FIG.10

| 11111111 or ONU-ID1 (No ONU-ID assigned or ONU-ID1 is assigned to the ONU) |
|---|
| 10000011 (Indicating that the message type is "Serial_Number") |
| Data (Sequence number information) |
| CRC |
| 11111111 or ONU-ID1 (No ONU-ID assigned or ONU-ID1 is assigned to the ONU) |
| 10000001 (Indicating that the message type is "Random_Delay_ONU") |
| Data (Random time delay of the ONU when transmitting the sequence number) |
| 10000000 (Indicating that the message type is "Power_Mode_ONU") |
| Data (Transmitting optical power level mode of the ONU) |
| CRC |

FIG.11

| |
|---|
| ONU-ID1 (ONU-ID1 is assigned to the ONU) |
| 10000011 (Indicating that the message type is "Serial_Number") |
| Data (Sequence number information) |
| CRC |
| ONU-ID1 (ONU-ID1 is assigned to the ONU) |
| 10000000 (Indicating that the message type is "Power_Mode_ONU") |
| Data (Transmitting optical power level mode of the ONU) |
| CRC |

FIG.12

| |
|---|
| ONU-ID1 (ONU-ID1 is assigned to the ONU) |
| 10000011 (Indicating that the message type is "Serial_Number") |
| Data (Sequence number information) |
| 10000000 (Indicating that the message type is "Power_Mode_ONU") |
| Data (Transmitting optical power level mode of the ONU) |
| CRC |

FIG.13

| |
|---|
| ONU-ID1 |
| 10000011 (Indicating that the message type is "Serial_Number") |
| Data (Sequence number information of the ONU) |
| CRC |
| ONU-ID1 |
| 00000010 (Indicating that the message type is a password information) |
| Data (The password of the ONU) |
| CRC |

FIG.14

| |
|---|
| 11111111(ONU-ID value, indicating the broadcast message to transmit to all the ONUs) |
| 10000001 (Indicating that the message type is "Guard_Bit_Message") |
| Data (The number of guard bits) |
| CRC |
| 11111111(ONU-ID value, indicating the broadcast message to transmit to all the ONUs) |
| 10000010 (Indicating that the message type is "Preamble_Bit_Message") |
| Data (Preamble bit modes of type1, type 2 and type 3) |
| CRC |
| 11111111(ONU-ID value, indicating the broadcast message to transmit to all the ONUs) |
| 10000100 (Indicating that the message type is "Delimiter_Bit_Message") |
| Data (The programmable data in the delimiters of the first byte, the second byte and the third byte) |
| CRC |
| 11111111(ONU-ID value, indicating the broadcast message to transmit to all the ONUs) |
| 10001000 (Indicating that the message type is "Pre-assigned_delay_Message") |
| Data (The pre-assigned equalization time delay) |
| CRC |
| 11111111(ONU-ID value, indicating the broadcast message to transmit to all the ONUs) |
| 10001000 (Indicating that the message type is "Extra_SN-transmissions_Times_Message") |
| Data (The maximum number of times for the extra allowed SN transmission (SN-transmissions) to respond to the identical SN-request) |
| CRC |
| 11111111 or ONU-ID (No ONU-ID alligned or the ONU-ID is assigned to the ONU) |
| 10000000 (Indicating that the message type is "Power_Mode_ONU") |
| Data (Transmitting optical power level mode of the ONU) |
| CRC |

FIG.15

TRANSMISSION METHOD AND ASSEMBLING METHOD FOR PHYSICAL LAYER OPERATIONS, ADMINISTRATION AND MAINTENANCE (PLOAM) MESSAGE IN A PASSIVE OPTICAL NETWORK

TECHNICAL FIELD

The present invention relates to the technical field of communication, and especially to a transmission method and assembling method for a PLOAM (Physical Layer Operations, Administration, and Maintenance) message in a passive optical network.

BACKGROUND OF THE RELATED ART

GPON (Gigabit-Capable Passive Optical Network) technology is an important technical branch in a passive optical network family, which is also a passive optical access technology using, similar to other PON technologies, point-to-multipoint topology.

GPON is composed of an office side OLT (optical line terminal), a user side ONU (optical network unit) and an ODN (optical distribution network), and uses commonly a point-to-multipoint network structure. The ODN is composed of a single mode optical fiber, an optical divider and an optical connector and other passive optical devices, providing an optical transmission medium for the physical connection between the OLT and the ONU.

To realize part of the management function of the OLT for the ONU, the G.984.3 standard of the ITU-T defines a PLOAM passage, by which the GPON transmits PLOAM messages to realize the management for a transmission collective layer, which includes ONU activation, the creation of an ONU management and control passage, encrypting configuration, key management and so on. The PLOAM message is transmitted in an upstream frame (the frame transmitted by the ONU to the OLT) and a downstream frame (the frame transmitted by the OLT to the ONU). Each downstream frame comprises a PLOAM message, and the OLT determines whether an upstream frame comprises a PLOAM message. The GPON defines 18 PLOAMd (physical layer operations, administration and maintenance downstream) messages transmitted by the OLT to the ONU, and 9 PLOAMu (physical layer operations, administration and maintenance upstream) messages transmitted by the ONU to the OLT. The formats of the PLOAM messages comprised in the downstream frame and the upstream frame are the same, as shown in FIG. 1.

The one-byte ONU identification (ID) in FIG. 1 is used to identify a specific ONU. During an activation process, each ONU obtains a number: ONU ID, the range of which may be from 0 to 253, and 255 is used to broadcast to all the ONUs; the one-byte message ID is used to identify the type of a PLOAM message; the Data of ten bytes are used to carry the payload of the GPON transmission collective layer message; the one-byte CRC is a frame check sequence, which will be discarded by the receiving end when the CRC is not correct.

The OLT transmits the PLOAMd to the ONU in the downstream frame. After receiving the PLOAMd message, the ONU firstly makes a CRC check, and discards the PLOAMd message when the result of the CRC check is wrong; if the check result is correct, the ONU judges whether the PLOAMd message is transmitted to itself according to the ONU ID in the PLOAMd message, if yes, the ONU performs the corresponding operation according to the Message ID in the PLOAMd and the content of the Data, and if not, the ONU discards the PLOAMd message. The OLT notifies the ONU whether to transmit the PLOAM message in the upstream bandwidth by the bit10 of the Flags domain of the allocation structure of the downstream frame, and if the bit is set to 1 by the OLT, the ONU transmits the PLOAM message in the upstream bandwidth, or else, the ONU does not transmit the PLOAM message in the upstream bandwidth.

The PLOAM message is transmitted in the form of clear text in a GPON system. Because the natural broadcast form is used in the downstream direction (from the OLT to the ONU), every ONU will receive all the PLOAM messages, obtain the PLOAM message belonging to itself according to the ONU-ID, and discard the PLOAM messages transmitted to other ONUs. If a malicious ONU which is reprogrammed exists in the network, the malicious ONU will monitor the PLOAM messages transmitted to other ONUs from the OLT. If the malicious ONU monitors the sequence number of a legal ONU, then the malicious ONU may complete its registration and activation process with the sequence number of the legal ONU after the legal ONU is powered down, thus causing an illegal ONU to be able to access the GPON system.

The PLOAM messages transmitted by the ONU in the upstream direction have two threats of illegal monitoring: if the optical divider in the GPON uses a 2: N spectrometer, as shown in FIG. 2, an illegal user can monitor the PLOAM messages transmitted by all the ONUs through the B port shown in the FIG. 2; the illegal user may also probe the upstream signal optical fiber in the way of, for example, bending the optical fiber, thereby monitoring the upstream messages. The security of the GPON system is threatened for the above reasons and thus the PLOAM messages need to be encrypted. While considering encrypting the PLOAM messages, it also needs to avoid occurrence of the case where the encrypted information is decrypted easily by the illegal users. If we encrypt the whole PLOAM message, the key information is easy to leak when the encryption is performed for the whole PLOAM message if part of fixed and unchanged content exists in the PLOAM message, or part of easily exhaustive content exists in the PLOAM message, thus making it easy for the illegal user to analyze and embezzle the information of other illegal users.

In conclusion, the format and transmission method for the PLOAM message defined by the GPON have the following problems:

1. each downstream frame could only transmit one PLOAM message to one ONU, and the efficiency of such a method for transmitting the PLOAM message is very low when a plurality of ONUs are connected in the GPON system, and the low efficiency is especially apparent when lots of PLOAMds need to be transmitted at the time when the ONU is registered or switched to a redundant path;

2. in general, four to five bytes on average in the Data domain of a PLOAM message carry no valid information, and the whole Data domain (ten bytes) of some PLOAM messages does not carry any useful information at all, such as the Request_Key PLOAMd message and the Dying_Gasp PLOAMu message, which causes the waste of upstream and downstream bandwidths in a certain degree;

3. the Data domain in the PLOAM message defined by the GPON is 10 bytes, making one PLOAM message not able to complete the transmission of a PLOAM message whose Data domain is bigger than 10 bytes;

4. some PLOAM messages carry two more kinds of information, and when the OLT or ONU needs only to transmit one kind of information of a certain PLOAM message, the transmitted PLOAM message carries part of invalid information, and the transmission mechanism is not flexible;

5. part of the PLOAM message can not be encrypted;

6. whenever an ONU takes over a GPON medium from another ONU, new PLOu data comprising an ONU ID must be transmitted, and because the ONU ID is also comprised in the PLOAMu message transmitted by the ONU, the ONU ID content in the PLOAMu message is redundant.

SUMMARY OF THE INVENTION

The technical problem to solve by the invention is to provide a transmission method and an assembling method for a physical layer operations, administration, and maintenance message in a passive optical network, which are able to improve transmission efficiency and save bandwidth.

To solve the above technical problem, the invention provides a transmission method for a physical layer operations, administration and maintenance (PLOAM) message in a passive optical network, the method comprising:

a transmitter dividing a PLOAM message to generate more than two new PLOAM messages, each of which comprises at least a message identification (Message ID) field; and the transmitter transmitting the new PLOAM messages identified with Message IDs.

The new PLOAM messages generated further comprise an optical network unit identification (ONU ID) field and/or a data field.

In the step of the transmitter transmitting the new PLOAM messages identified with Message IDs, the transmitter transmits the new PLOAM messages in any one of following ways: assembling n arbitrary new PLOAM messages into one PLOAM message group to transmit, n≥1 and n is an integer; assembling part of fields of n new PLOAM messages into one PLOAM message group to transmit; assembling n new PLOAM messages with an undivided PLOAM message into one PLOAM message group to transmit; assembling part of fields of n new PLOAM messages with an undivided PLOAM message into one PLOAM message group to transmit; wherein, in above ways, the n new PLOAM messages are from one PLOAM message or a plurality of PLOAM messages.

There are t ONU IDs in the assembled PLOAM message group, 0≤t≤n, and t is an integer.

The PLOAM message group carries a cyclic redundancy check (CRC), wherein, each new PLOAM message is corresponding to one CRC, or a plurality of new PLOAM messages share one CRC.

The data field in the new PLOAM message is null.

The assembled PLOAM message group occupies N*X bytes, wherein, N≥1 and N is an integer, X is a length of a PLOAM message format defined in a standard.

The transmitter is an OLT; after the step of the transmitter transmitting the new PLOAM messages identified with Message IDs, the method further comprises: after receiving the PLOAM message group, an ONU, which is as a receiver, analyzing the CRC from the PLOAM message group firstly, analyzing an ONU ID from a new PLOAM message corresponding to a correct CRC; and when the ONU ID indicates the new PLOAM message is a PLOAM message which should be received by the ONU itself, the ONU continuing to read the Message ID in the new PLOAM message.

The transmitter is an ONU; after the step of the transmitter transmitting the new PLOAM messages identified with Message IDs, the method further comprises: after receiving the PLOAM message group, an OLT, which is as a receiver, analyzing the CRC from the PLOAM message group firstly, analyzing an ONU ID from a new PLOAM message corresponding to a correct CRC, knowing the ONU which transmits the PLOAM message group; or analyzing an ONU ID from an upstream burst frame in which the PLOAM message group is, knowing the ONU which transmits the PLOAM message group; and the OLT continuing to read the Message ID of the new PLOAM message.

The method further comprises: after reading the Message ID, the receiver continuing to read the data field to obtain message content corresponding to the Message ID.

When the divided message is an ONU sequence number message, the new PLOAM messages generated after the transmitter divides the ONU sequence number message comprise:

a new PLOAM message carrying sequence number information of the ONU; a new PLOAM message carrying a random time delay of the ONU; a new PLOAM message carrying a transmitting optical power level mode of the ONU; or a new PLOAM message carrying vendor identification information; a new PLOAM message carrying sequence number information of a specific vendor; a new PLOAM message carrying a random time delay of the ONU; a new PLOAM message carrying a transmitting optical power level mode of the ONU.

When the divided PLOAM message is an upstream overhead message, the new PLOAM messages generated after the transmitter divides the upstream overhead message comprise: a new PLOAM message carrying information of a number of guard bits; a new PLOAM message carrying a preamble; a new PLOAM message carrying a delimiter; a new PLOAM information carrying a pre-equalization time delay; a new PLOAM information carrying a maximum number of times for extra allowed transmitting of a sequence number transmission message to respond to an identical sequence number request; a new PLOAM information carrying a defaulted transmitting optical power level mode of the ONU.

When the divided PLOAM message is a bandwidth identification assignment message, the new PLOAM messages generated after the transmitter dividing the bandwidth identification assignment message comprise: a new PLOAM message carrying sequence number information of the ONU; a new PLOAM message carrying ONU-ID information assigned to the ONU by the OLT.

When the divided PLOAM message is a disabled sequence number message, the new PLOAM messages generated after the transmitter dividing the disabled sequence number message comprise: a new PLOAM message carrying sequence number information of the ONU; a new PLOAM message carrying an instruction transmitted from the OLT to the ONU.

To solve the above technical problem, the invention also provides an assembling method for a physical layer operations, administration and maintenance (PLOAM) message in a passive optical network, the method comprising:

a transmitter assembling a plurality of PLOAM messages into one PLOAM message to transmit.

The assembled PLOAM message group occupies N*X bytes, wherein, N≥1 and N is an integer, X is a length of a PLOAM message format defined in a standard.

The a plurality of PLOAM messages comprise new PLOAM messages after a division and/or an undivided PLOAM message, the new PLOAM message comprises at least a message identification (Message ID) field, and the assembling way is one of following ways: assembling n arbitrary new PLOAM messages into one PLOAM message group to transmit, n≥1 and n is an integer; assembling part of fields of n new PLOAM messages into one PLOAM message group to transmit; assembling n new PLOAM messages with an undivided PLOAM message into one PLOAM message group to transmit; assembling part of fields of n new PLOAM messages with an undivided PLOAM message into one PLOAM message group to transmit; assembling n undivided PLOAM messages into one PLOAM message group to transmit;

wherein, in above ways, the n new PLOAM messages are from one PLOAM message or a plurality of PLOAM messages.

There are t ONU IDs in the assembled PLOAM message group, 0≤t≤n, and t is an integer.

The PLOAM message group carries a cyclic redundancy check (CRC), wherein, each new PLOAM message is corresponding to one CRC, or a plurality of new PLOAM messages share one CRC.

By using the method of the invention, the invention improves the efficiency of the PLOAM message transmission, avoids bandwidth waste, and simultaneously improves the flexibility and timeliness of the PLOAM message transmission between the OLT and the ONU.

BRIEF DESCRIPTION OF DRAWINGS

The drawings are used to provide the further understanding of the invention, and constitute part of the specification to explain the invention along with the Examples in the invention, but not to limit the invention. In the drawings:

FIG. 4 illustrates PLOAM message assembling in the Example one of the invention;

FIG. 5 (*a*) and FIG. 5 (*b*) are diagrams of a PLOAMd message group transmitted to the ONU by the OLT in the Example one of the invention;

FIG. 6 illustrates PLOAM message assembling in the Example two of the invention;

FIG. 7 is a diagram of a PLOAMd message group transmitted to the ONU by the OLT in the Example two of the invention;

FIG. 8 illustrates PLOAM message assembling in the Example three of the invention;

FIG. 9 is a diagram of a PLOAMd message group transmitted to the ONU by the OLT in the Example three of the invention;

FIG. 10 is a diagram of the PLOAM message group transmitted by the ONU for responding to the SN-request of the OLT in the Example four of the invention;

FIG. 11 is a diagram of the PLOAM message group transmitted by the ONU for responding to the SN-request of the OLT in the Example four of the invention;

FIG. 12 is a diagram of the PLOAM message group transmitted by the ONU for responding to the Ranging-Request of the OLT in the Example four of the invention;

FIG. 13 is a diagram of the PLOAM message group transmitted by the ONU for responding to the Ranging-Request of the OLT in the Example four of the invention;

FIG. 14 is a diagram of the PLOAM message group transmitted by the ONU for responding to the SN-request and the Password Request transmitted simultaneously by the OLT in the Example four of the invention;

FIG. 15 is a diagram of the PLOAM message group of the Upstream_Overhead reassembled by the OLT in the Example five of the invention.

PREFERRED EMBODIMENTS OF THE PRESENT INVENTION

Figure 1:
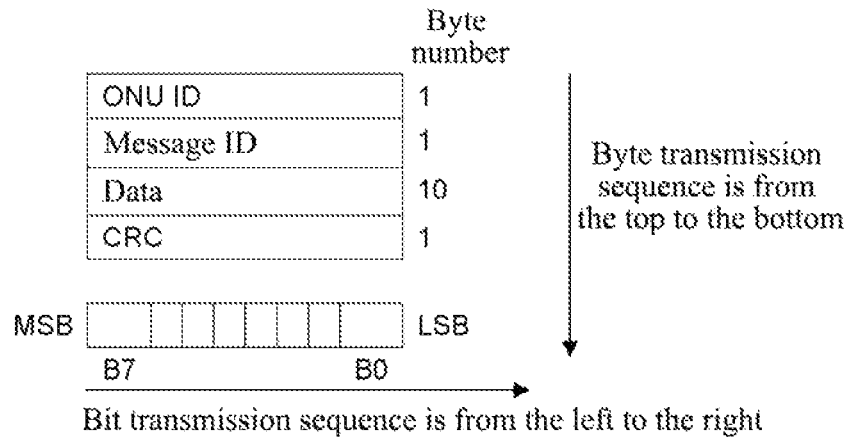
FIG. 1 is a diagram of the PLOAM message format defined by the G.984.3.
Figure 2:
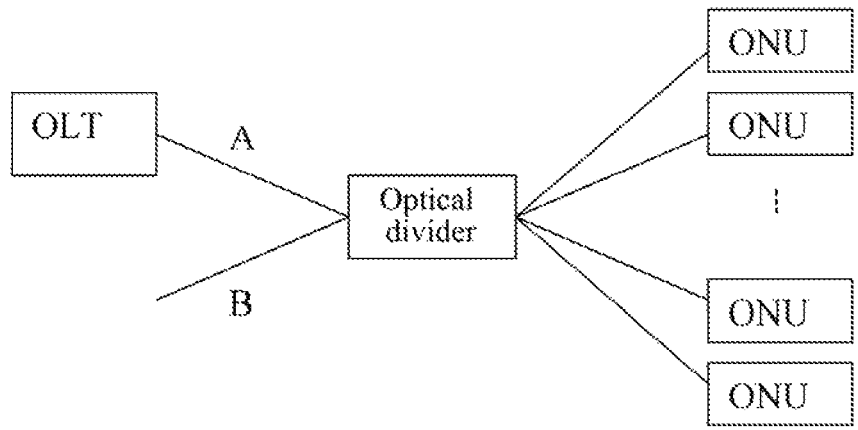
FIG. 2 is a topology structure of the GPON system.
Figure 3:
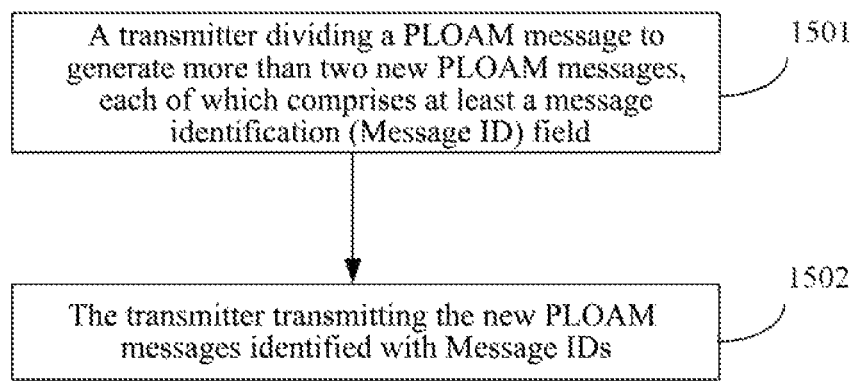
FIG. 3 is a flowchart of a PLOAM division transmission method in a passive optical network.

To solve the deficiency mentioned in the preceding related art, the invention provides a division transmission method, as shown in FIG. 3, the method comprising:

step 301, a transmitter dividing a PLOAM message to generate more than two new PLOAM messages, each of which comprises at least a message identification (Message ID) field;

step 302, the transmitter transmitting the new PLOAM messages identified with Message IDs.

By using the division transmission method, only the information needed by a receiver is transmitted, so the transmission mechanism is more flexible; according to the above division transmission mechanism, the information that needs to be encrypted in the original PLOAM message may be divided out to realize to encryption of part of information in the original PLOAM message, thereby improving the security.

Preferably, each new PLOAM message carries only one kind of information, i.e. each new PLOAM message has only a single function. Each Message ID identifies a kind of function, and simultaneously identifies a new PLOAM message.

When transmitting a PLOAM message, the transmitter assembles n arbitrary new PLOAM messages into one PLOAM message group to transmit, wherein n≥1 and n is an integer. By way of the message group, a plurality of new PLOAM messages may be transmitted simultaneously, thus improving the transmission efficiency of the PLOAM message.

The new PLOAM messages generated further comprise an optical network unit identification (ONU ID) field and/or a data field.

Preferably, the transmitter transmits the new PLOAM messages in any one of following ways:

assembling n arbitrary new PLOAM messages into one PLOAM message group to transmit;

assembling part of fields of n new PLOAM messages into one PLOAM message group to transmit;

assembling n new PLOAM messages with an undivided PLOAM message into one PLOAM message group to transmit;

assembling part of fields of n new PLOAM messages with a PLOAM message not being divided into one PLOAM message group to transmit;

wherein, in above ways, the n new PLOAM messages are from one PLOAM message or a plurality of PLOAM messages.

Preferably, the transmitter may or may not carry the ONU ID in the PLOAM message group. Usually, in the downstream direction, when the a plurality of new PLOAM messages are transmitted to different receivers respectively, the transmitter will carry t ONU IDs (0≤t≤n, and t is an integer), i.e. the a plurality of new PLOAM messages may share one ONU ID, or certain new PLOAM messages in the message group share one ONU ID, or each new PLOAM message is corresponding to one ONU ID respectively, i.e. each Message ID is corresponding to one ONU ID. Usually, in the upstream direction, when all the new PLOAM messages in the message group are from one transmitter, the transmitter may notify the ONU ID to the receiver through the transmitter information in the upstream burst frame and not carry the ONU ID in the message group. Of course, the transmitter may also carry the ONU ID in the message group, in which case the processing method is the same as in the downstream direction.

In the assembling process, the transmitter carries a cyclic redundancy check (CRC) in the message group, wherein, each new PLOAM message is corresponding to one CRC, or a plurality of new PLOAM messages share one CRC. That is to say, there are m CRCs carried in the PLOAM message group, $1 \leq m \leq n$ and m is an integer, and each CRC is corresponding to one or more new PLOAM messages.

The sharing mechanism for the ONU ID and/or CRC saves more bandwidth, and avoids the occurrence of redundancy.

Preferably, each new PLOAM message generated after the division may carry a data (Data) field in addition to the Message ID, and the bytes, which are not fixed to be 10 bytes, occupied by the Data field are determined according to the content carried by the PLOAM message. Thus, when a lot of content needs to be carried, it is ensured that the content may be transmitted to the receiver in one transmission, and a plurality of transmissions are not necessary. When little content needs to be carried, the remaining bytes may be left to other fields or other PLOAM messages. In addition, when the Data field is not needed, the field may be not carried, thus further avoiding the bandwidth waste.

Preferably, each PLOAM message group occupies N*X bytes, wherein, $N \geq 1$ and N is an integer, X is a length of a PLOAM message format defined in a standard. For the GPON system, the PLOAM format length is 13 bytes, and for the XGPON system, the PLOAM message may have 16 bytes or 24 bytes and so on.

For the above division transmission method, the corresponding receiving methods include the following kinds of methods:

(a) when the transmitter is an OLT, after receiving the PLOAM message group, an ONU, which is as a receiver, analyzing the CRC from the PLOAM message group firstly, and analyzing an ONU ID from a new PLOAM message corresponding to a correct CRC; and when the ONU ID indicates the new PLOAM message is a PLOAM message which should be received by the ONU itself, the ONU continuing to read the Message ID in the new PLOAM message, and knowing the function of the new PLOAM message according to the Message ID in the new PLOAM message.

(b) when the transmitter is an ONU, after receiving the PLOAM message group, an OLT, which is as a receiver, analyzing the CRC from the PLOAM message group firstly, analyzing an ONU ID from a new PLOAM message corresponding to a correct CRC, and knowing the ONU which transmits the PLOAM message group; or analyzing an ONU ID from an upstream burst frame in which the PLOAM message group is, knowing the ONU which transmits the PLOAM message group; the OLT continuing to read a Message ID of the new PLOAM message.

Furthermore, after reading the Message ID, the receiver continues to read the data field to obtain the message content corresponding to the Message ID.

The assembling method for a PLOAM message comprises: a transmitter assembling a plurality of PLOAM messages into one PLOAM message to transmit.

The above a plurality of PLOAM messages comprise new PLOAM messages after a division and/or an undivided PLOAM message, the new PLOAM message comprise at least a message identification (Message ID) field, and the assembling way is one of following ways:

assembling n arbitrary new PLOAM messages into one PLOAM message group to transmit, $n \geq 1$ and n is an integer;

assembling part of fields of n new PLOAM messages into one PLOAM message group to transmit;

assembling n new PLOAM messages with an undivided PLOAM message into one PLOAM message group to transmit;

assembling part of fields of n new PLOAM messages with an undivided PLOAM message into one PLOAM message group to transmit;

wherein, in above ways, the n new PLOAM messages are from one PLOAM message or a plurality of PLOAM messages.

The advantage for assembling a plurality of undivided PLOAM messages into a message group is that a plurality of PLOAM messages may be transmitted or received once, equivalent to the volume increase of the PLOAM passage.

An assembling method for a PLOAM message, the method comprising: a transmitter assembling n PLOAM messages into a PLOAM message to transmit, at least n Message IDs corresponding to n PLOAM messages and m CRCs being capsulated in each PLOAM message group, wherein, $n \geq 2$ and n is an integer, $1 \leq m \leq n$ and m is an integer, each CRC is corresponding to one or more PLOAM messages.

Preferably, t ONU IDs are also encapsulated in the PLOAM message group, wherein, $0 \leq t \leq n$ and t is an integer, each CRC is corresponding to one or more PLOAM messages.

Preferably, n data fields are also encapsulated behind the Message ID of each PLOAM message in the PLOAM message group, corresponding to n PLOAM messages.

A transmission device for a PLOAM message in a passive optical network, the device comprising:

a message dividing module, which is configured to: divide a PLOAM message to generate more than two new PLOAM messages, each of which comprises at least a message identification (Message ID) field; and a message transmitting module, which is configured to: transmit the new PLOAM messages identified with Message IDs.

The message transmitting module is configured to transmit the new PLOAM messages in any one of the following ways:

assembling n arbitrary new PLOAM messages into one PLOAM message group to transmit, $n \geq 1$ and n is an integer;

assembling part of fields of n new PLOAM messages respectively into one PLOAM message group to transmit;

assembling n new PLOAM messages with an undivided PLOAM message into one PLOAM message group to transmit;

assembling part of fields of n new PLOAM messages with an undivided PLOAM message into one PLOAM message group to transmit;

wherein, in above ways, the n new PLOAM messages are from one PLOAM message or a plurality of PLOAM messages.

There are t ONU IDs in the assembled PLOAM message group, wherein, $0 \leq t \leq n$ and t is an integer.

When the divided message is an ONU sequence number message, the new PLOAM messages generated after the message dividing module divides the ONU sequence number message comprise:

a new PLOAM message carrying sequence number information of the ONU; a new PLOAM message carrying a random time delay of the ONU; a new PLOAM message carrying a transmitting optical power level mode of the ONU; or a new PLOAM message carrying vendor identification information; a new PLOAM message carrying sequence number information of a specific vendor; a new PLOAM message carrying a random time delay of the ONU; a new PLOAM message carrying a transmitting optical power level mode of the ONU.

When the divided PLOAM message is an upstream overhead message, the new PLOAM messages generated after the message dividing module divides the upstream overhead message comprise:

a new PLOAM message carrying information of the number of guard bits; a new PLOAM message carrying a preamble; a new PLOAM message carrying a delimiter; a new PLOAM information carrying a pre-equalization time delay; a new PLOAM information carrying a maximum number of times for extra allowed transmitting of a sequence number transmission message to respond to an identical sequence number request; a new PLOAM information carrying a defaulted transmitting optical power level mode of an ONU.

When the divided PLOAM message is a bandwidth identification assignment message, the new PLOAM messages generated after the message dividing module divides the bandwidth identification assignment message comprise:

a new PLOAM message carrying sequence number information of an ONU; a new PLOAM message carrying ONU-ID information assigned to an ONU by an OLT.

When the divided PLOAM message is a disabled sequence number message, the new PLOAM messages generated after the message dividing module divides the disabled sequence number message comprise:

a new PLOAM message carrying sequence number information of an ONU; a new PLOAM message carrying an instruction transmitted from an OLT to an ONU.

The preferred examples of the invention are illustrated below with reference to the drawings. It should be understood that preferred examples described herein are only used to illustrate and explain the invention, and not used to limit the invention. The examples and the characteristics in the examples of the invention, unless conflicting to each other, may be combined with each other.

Several examples will be provided below where GPON is taken as an example. For XGPON, the number of bytes of a PLOAM message may be more, but the following assembling method may still be used. In the following examples, the Examples one to three are the assembling method for a PLOAM message, and the Examples four to seven are specific application instances, which state how to divide the existing PLOAM message into PLOAM messages whose carried data has a single function, and how to assemble the above PLOAM messages as needed.

EXAMPLE ONE

FIG. 4 illustrates the assembly of the PLOAM message in the Example one of the invention. As shown in FIG. 4, each complete PLOAM message comprises an ONU ID, a Message ID, Data and a CRC, and four complete PLOAM messages are assembled into a PLOAM message group. In the Example, the assembled PLOAM message group may have 13 bytes, or have an integer multiple of the 13 bytes.

For example, when the GPON system is in a registration and activation process of an ONU, an OLT transmits PLOAMd messages to different ONUs in a downstream frame, and the transmitted PLOAMd message are as shown in FIG. 5 (a).

The operations performed by the related ONU when receiving the PLOAMd message group composed of 4 PLOAMd messages shown in the FIG. 5 (a) will be analyzed below.

The last byte CRC of the first PLOAMd message is a frame check sequence. When the CRC is correct, the ONU begins to analyze the first PLOAMd message, or else, the ONU discards the first PLOAMd message. The value of the ONU-ID is 11111111, indicating that the PLOAMd message is a message broadcasted to all the ONUs. The ONU continues to read the Message ID field, where the Message ID is 00000011, indicating that the PLOAMd message is used to assign the ONU-ID to the ONU. The ONU continues to read the Data field, where the Data are the ONU-ID1 assigned by the OLT and the sequence number x of a certain ONU, indicating that the ONU-ID assigned to the ONU with the sequence number of x is ONU-ID1.

The last byte CRC of the second PLOAMd message is a frame check sequence. When the CRC is correct, the ONU begins to analyze the second PLOAMd message, or else, the ONU discards the second PLOAMd message. The value of the ONU-ID is 11111111, indicating that the second PLOAMd message is a message broadcasted to all the ONUs. The ONU continues to read the Message ID field, where the Message ID is 00000011, indicating that the PLOAMd message is used to assign the ONU-ID to the ONU. The ONU continues to read the Data field, where the Data are the ONU-ID2 assigned by the OLT and the sequence number y of a certain ONU, indicating that the ONU-ID assigned to the ONU with the sequence number y is ONU-ID2.

The last byte CRC of the third PLOAMd message is a frame check sequence. When the CRC is correct, the ONU begins to analyze the third PLOAMd message, or else, the ONU discards the third PLOAMd message. The value of the ONU-ID is ONU-ID3, indicating that the third PLOAMd message is to be transmitted to the ONU whose ONU-ID is ONU-ID3. The ONU, whose ONU-ID is ONU-ID3, continues to read the Message ID field, where the Message ID is 00000100, indicating that the third PLOAMd message is used for the OLT to assign an equalization time delay for the ONU whose ONU-ID is ONU-ID3. The ONU continues to read the Data field, where the Data is the equalization time delay value L1 assigned by the OLT to the ONU whose ONU-ID is ONU-ID3.

The last byte CRC of the four PLOAMd message is a frame check sequence. When the CRC is correct, the ONU begins to analyze the fourth PLOAMd message, or else, the ONU discards the fourth PLOAMd message. The value of the ONU-ID is ONU-ID4, indicating that the fourth PLOAMd message is to be transmitted to the ONU whose ONU-ID is ONU-ID4. The ONU, whose ONU-ID is ONU-ID4, continues to read the Message ID field, where the Message ID is 00000100, indicating that the fourth PLOAMd message is used for the OLT to assign an equalization time delay for the ONU whose ONU-ID is ONU-ID4. The ONU continues to read the Data field, where the Data is the equalization time delay value L2 assigned by the OLT to the ONU whose ONU-ID is ONU-ID4.

The length of the PLOAM message group in the Example is fixed, but the length of the PLOAM message group may vary. The PLOAM message in the Example comprises four parts, which are respectively the ONU ID, the Message ID, the Data and the CRC. The PLOAM message may also comprise part of the above four contents, for example, comprising the ONU ID, the Message ID and the CRC but not comprising the Data, as can be seen in the following Example.

When the OLT in the GPON system needs to exchange keys with a plurality of ONUs, the OLT transmits PLOAMd messages (Request_Key messages in this Example) to different ONUs in a downstream frame, and the transmitted Request_Key messages are as shown in FIG. 5 (b).

The operations performed by the related ONU when receiving the PLOAMd message group composed of 4 PLOAMd messages shown in the FIG. 5 (b) will be analyzed below.

The last byte CRC of the first PLOAMd message is a frame check sequence. When the CRC is correct, the ONU begins to analyze the first PLOAMd message, or else, the ONU discards the first PLOAMd message. The value of the ONU-ID is ONU-ID1, indicating that the first PLOAMd message is to be transmitted to the ONU whose ONU-ID is ONU-ID1. The ONU, whose ONU-ID is ONU-ID1, continues to read the Message ID field, where the Message ID is 00001101, indicating that the first PLOAMd message is used to request for the key from the ONU;

The last byte CRC of the second PLOAMd message is a frame check sequence. When the CRC is correct, the ONU begins to analyze the second PLOAMd message, or else, the ONU discards the second PLOAMd message. The value of the ONU-ID is ONU-ID2, indicating that the second PLOAMd message is to be transmitted to the ONU whose ONU-ID is ONU-ID2. The ONU, whose ONU-ID is ONU-ID2, continues to read the Message ID field, where the Message ID is 00001101, indicating that the second PLOAMd message is used to request the key from the ONU;

The third and the fourth PLOAMd messages are to be transmitted respectively to the ONU whose ONU-ID is ONU-ID3 and the ONU whose ONU-ID is ONU-ID4, and other operations are the same as for the first PLOAM message and will be repeated here.

In this Example, each Request_Key message in the PLOAM message group comprises only the ONU-ID, the Message ID and the CRC, and the Data domain is not comprised.

By way of the above Example, the OLT transmits 4 PLOAMd messages in a downstream frame, improving the efficiency for transmitting the PLOAMd messages. Of course, 3 PLOAMd messages may be comprised in other Examples, and the specific number is determined as needed.

In the XGPON developed based on the GPON, the PLOAMd message may comprise, besides the above mentioned ONU ID, Message ID, Data and CRC, other contents, for example, the Sequence No for indicating the sequence number of the PLOAM message transmitted in the downstream.

EXAMPLE TWO

FIG. 6 illustrates the assembly of the PLOAM message in the Example two of the invention. As shown in FIG. 6, each complete PLOAM message comprises an ONU ID, a Message ID and Data, and four PLOAM messages are assembled into a PLOAM message group and share one CRC. In this Example, the assembled PLOAM message group has 13 bytes.

For example, when the GPON system is in a registration and activation process of an ONU, an OLT transmits PLOAMd messages to different ONUs in a downstream frame, and the transmitted PLOAM message is as shown in FIG. 7.

The operations performed by the related ONU when receiving the PLOAMd message group composed of 4 PLOAMd messages shown in the FIG. 7 will be analyzed below.

The last part of the PLOAMd message group is a CRC frame check sequence. When the CRC is correct, the ONU begins to analyze the PLOAMd message group, or else, the ONU discards the PLOAMd message group.

The value of the ONU-ID of the first PLOAMd message is 11111111, indicating that the first PLOAMd message is a message broadcasted to all the ONUs. The ONU continues to read the Message ID field, where the Message ID is 00000011, indicating that the PLOAMd message is used to assign the ONU-ID to the ONU. The ONU continues to read the Data field, where the Data are the ONU-ID1 assigned by the OLT and the sequence number x of a certain ONU, indicating that the ONU-ID assigned to the ONU with the sequence number x is ONU-ID 1.

The value of the ONU-ID of the second PLOAMd message is 11111111, indicating that the second PLOAMd message is a message broadcasted to all the ONUs. The ONU continues to read the Message ID field, where the Message ID is 00000011, indicating that the second PLOAMd message is used to assign the ONU-ID to the ONU. The ONU continues to read the Data field, where the Data are the ONU-ID2 assigned by the OLT and the sequence number y of a certain ONU, indicating that the ONU-ID assigned to the ONU with the sequence number y is ONU-ID2.

The value of the ONU-ID of the third PLOAMd message is ONU-ID3, indicating that the third PLOAMd message is to be transmitted to the ONU whose ONU-ID is ONU-ID3. The ONU, whose ONU-ID is ONU-ID3, continues to read the Message ID field, where the Message ID is 00000100, indicating that the third PLOAMd message is used for the OLT to assign an equalization time delay for the ONU whose ONU-ID is ONU-ID3. The ONU whose ONU-ID is ONU-ID3 continues to read the Data field, where the Data is the equalization time delay value L1 assigned by the OLT to the ONU whose ONU-ID is ONU-ID3.

The value of the ONU-ID of the fourth PLOAMd message is ONU-ID4, indicating that the fourth PLOAMd message is to be transmitted to the ONU whose ONU-ID is ONU-ID4. The ONU, whose ONU-ID is ONU-ID4, continues to read the Message ID field, where the Message ID is 00000100, indicating that the fourth PLOAMd message is used for the OLT to assign an equalization time delay for the ONU whose ONU-ID is ONU-ID4. The ONU whose ONU-ID is ONU-ID4 continues to read the Data field, where the Data is the equalization time delay value L2 assigned by the OLT to the ONU whose ONU-ID is ONU-ID4.

By way of the Example, the OLT transmits four PLOAMd messages in a downstream frame, and the four PLOAMd messages share a CRC, thus saving the bytes of the PLOAM message group, and improving the efficiency of the PLOAMd message transmission.

The length of the PLOAM message group in the Example is fixed, but the length of the PLOAM message group may vary. Each PLOAM message in the Example comprises three parts, namely the ONU ID, the Message ID and the Data respectively. Four PLOAMd messages share one CRC. The PLOAM message may also comprise part of the above three contents only, for example, comprising only the ONU ID and the Message ID but not comprising the Data; as is illustrated in the second instance in the Example one. In addition, the PLOAM message may also comprise other contents.

EXAMPLE THREE

FIG. 8 illustrates the assembly of the PLOAM message in the Example three of the invention. As shown in FIG. 8, each complete PLOAM message comprises a Message ID and Data, and two PLOAM messages are assembled into a PLOAM message group and sharing one ONU ID and one CRC. It can be used for the OLT to transmit to the ONU a plurality of PLOAMd messages, or the ONU to transmit to the OLT a plurality of PLOAMu messages, avoiding multiple times of transmission of the content of the repeated ONU-ID. The PLOAMd message group has only one CRC frame check sequence, saving the bytes for the PLOAM message group. In the example, the PLOAM message group has 13 bytes.

For example, when the OLT needs to transmit a plurality of PLOAMd messages to the ONU, and the transmitted PLOAM message group is as shown in FIG. 9.

The operations performed by the related ONU when receiving the PLOAMd message group composed of 2 PLOAMd messages shown in the FIG. 9 will be analyzed below.

The last part of the PLOAMd message group is a CRC frame check sequence. When the CRC is correct, the ONU begins to analyze the PLOAMd message group, or else, the ONU discards the PLOAMd message group. The first part of the PLOAMd message group is the ONU-ID, and the ONU corresponding to the ONU-ID analyzes the PLOAMd message group.

The Message ID of the first PLOAMd message is 00010010, indicating that the second PLOAMd message is used to assign interval values for the bit error rate to the ONU; the Data is the interval values for the bit error rate assigned by the OLT to the ONU.

The Message ID of the second PLOAMd message is 00010000, indicating that the second PLOAMd message is used for the OLT to order the ONU to change the light emitting optical power of the ONU; the Data is that the OLT controls the light emitting optical power of the ONU to increase, decrease or remain unchanged.

By way of the Example, the OLT transmits two PLOAMd messages in a downstream frame to an ONU, and the two PLOAMd messages share one ONU-ID and one CRC, thus saving the bytes of the PLOAM message group, and improving the efficiency of the PLOAMd message transmission.

The length of the PLOAM message group in the Example is fixed, but the length of the PLOAM message group may vary. Each PLOAM message in the Example comprises two parts, namely, the Message ID and the Data respectively. Two PLOAM messages share one ONU-ID and one CRC. The PLOAM message may also comprise part of the above two contents only, for example, comprising only the Message ID but not comprising the Data, for example, the Request_Key and the password request (Request_Password) message. In addition, the PLOAM message may also comprise other contents.

EXAMPLE FOUR

The Example illustrates the division of the ONU sequence number (Serial_Number_ONU) message implemented by the method in the invention.

The format of the Serial_Number_ONU message in the GPON is as shown in Table 1.

TABLE 1

Serial_Number_ONU message format

| Byte number | Content | Description |
| --- | --- | --- |
| 1 | 11111111 or ONU-ID | No ONU-ID assigned If the ONU-ID is assigned to the ONU |
| 2 | 00000001 | Indicating that the message type is "Serial_Number_ONU" |
| 3 | VID1 | The first byte of the vender identification (Vendor_ID) |
| 4 | VID2 | The second byte of the Vendor_ID |
| 5 | VID3 | The third byte of the Vendor_ID |
| 6 | VID4 | The fourth byte of the Vendor_ID |
| 7 | VSSN1 | The first byte of the sequence number of the specific Vendor |
| 8 | VSSN2 | The second byte of the sequence number of the specific Vendor |
| 9 | VSSN3 | The third byte of the sequence number of the specific Vendor |
| 10 | VSSN4 | The fourth byte of the sequence number of the specific Vendor |
| 11 | RRRRRRRR | The random time delay of the ONU when transmitting the message (MSB) (taking 32 bytes as a unit) |
| 12 | RRRRAGTT | RRRR = the random time delay of the ONU when transmitting the message (LSB) (taking 32 bytes as a unit) A = 0 G = the ONU supporting GEM transmission(G = 1-support) TT = transmitting optical power level mode of the ONU TT = 00: low power TT = 01: middle power TT = 10: high power TT = 11: reserved |

As shown in Table 1, the Serial_Number_ONU message carries three parts of information, namely the sequence number information of the ONU, the random time delay of the ONU when transmitting the message and the transmitting optical power level mode of the ONU respectively. In the Example, the ONU divides the Serial_Number_ONU message into three new PLOAM messages, each of which carries only part of the information with a single function. Wherein, the PLOAM message carrying the sequence number information of the ONU is called as a sequence number (Serial_Number) message; the PLOAM message carrying the random time delay of the ONU when transmitting the Serial_Number is called as an ONU random delay (Random_Delay_ONU) message; and the PLOAM message carrying the transmitting optical power level mode of the ONU is called as an ONU optical power mode (Power_Mode_ONU) message. The formats of the three new PLOAM messages are as shown in Table 2, Table 3 and Table 4. The values of the Message ID in the Table 2, Table 3 and Table 4 are only provided in the invention as an instance, and other values may be also set as needed.

TABLE 2

Serial_Number Message Format

| Byte number | Content | Description |
| --- | --- | --- |
| 1 | 11111111 or ONU-ID | No ONU-ID assigned If the ONU-ID is assigned to the ONU |
| 2 | 10000011 | Indicating that the message type is "Serial_Number" |
| 3 | VID1 | The first byte of the Vendor_ID |
| 4 | VID2 | The second byte of the Vendor_ID |
| 5 | VID3 | The third byte of the Vendor_ID |
| 6 | VID4 | The fourth byte of the Vendor_ID |
| 7 | VSSN1 | The first byte of the sequence number of the specific Vendor |
| 8 | VSSN2 | The second byte of the sequence number of the specific Vendor |

TABLE 2-continued

Serial_Number Message Format

| Byte number | Content | Description |
|---|---|---|
| 9 | VSSN3 | The third byte of the sequence number of the specific Vendor |
| 10 | VSSN4 | The fourth byte of the sequence number of the specific Vendor |

TABLE 3

Random_Delay_ONU Message Format

| Byte number | Content | Description |
|---|---|---|
| 1 | 11111111 or ONU-ID | No ONU-ID assigned / If the ONU-ID is assigned to the ONU |
| 2 | 10000001 | Indicating that the message type is "Random_Delay_ONU" |
| 3 | RRRRRRRR | The random time delay of the ONU when transmitting the Serial Number (MSB) |
| 4 | RRRRRRRR | The random time delay of the ONU when transmitting the Serial Number (LSB) |

TABLE 4

Power_Mode_ONU Message Format

| Byte number | Content | Description |
|---|---|---|
| 1 | 11111111 or ONU-ID | No ONU-ID aligned / If the ONU-ID is assigned to the ONU |
| 2 | 10000000 | Indicating that the message type is "Power_Mode_ONU" |
| 3 | XXXXXXTT | XXXXXX = 000000<br>TT = transmitting optical power level mode of the ONU<br>TT = 00: low power<br>TT = 01: middle power<br>TT = 10: high power<br>TT = 11: reserved |

The applications of the above Serial_Number, Random_Delay_ONU and Power_Mode_ONU in the GPON will be illustratively described below.

1. When the ONU is in the sequence number discovering process, the OLT transmits a sequence number request (SN_Request), and the ONU needs to transmit three PLOAM messages of the Serial_Number, Random_Delay_ONU and Power_Mode_ONU to respond.

The ONU may assemble the above three PLOAM messages in the way as described in the Example one, and the assembled PLOAM message group is as shown in FIG. 10.

After receiving the PLOAMu message group as shown in FIG. 10, the OLT judges whether the three CRCs in the PLOAMu message group are correct, and the OLT analyzes the PLOAMu messages corresponding to a correct CRC, and discards the PLOAMu messages corresponding to a wrong CRC.

When all the three CRCs are correct, the OLT judges the message type is "Serial_Number" according to the Message ID value 10000011 of the first PLOAMu message, and thus reads the sequence number information of the ONU; the OLT judges the message type is "Random_Delay_ONU" according to the Message ID value 10000001 of the second PLOAMu message, and thus reads the random time delay value of the ONU when transmitting the Serial Number; the OLT judges the message type is "Power_Mode_ONU" according to the Message ID value 10000000 of the third PLOAMu message, and thus reads the transmitting optical power level mode of the ONU.

The above content illustrates that the ONU assembles the above three PLOAMu messages in the way as described in the Example 1, and the ONU may also assemble the Random_Delay_ONU and the Power_Mode_ONU in the way as described in the Example three, and then assemble the Serial_Number message and the above two PLOAM messages in the way as described in the Example one. The assembled PLOAM message group is as shown in FIG. 11.

After receiving the PLOAM message group as shown in FIG. 11, the OLT judges whether the two CRCs of the PLOAMu message group are correct, and analyzes the PLOAMu messages corresponding to a correct CRC, and discards the PLOAMu messages corresponding to a wrong CRC.

When the two CRCs are both correct, the OLT judges the message type is "Serial_Number" according to the Message ID value 10000011 of the first PLOAMu message, and thus reads the sequence number information of the ONU; the OLT judges the message type is "Random_Delay_ONU" according to the Message ID value 10000001 of the second PLOAMu message, and thus reads the random time delay value of the ONU when transmitting the Serial Number; the OLT judges the message type is "Power_Mode_ONU" according to the Message ID value 10000000 of the third PLOAMu message, and thus reads the transmitting optical power level mode of the ONU.

2. When the ONU is in the ranging phase, the OLT transmits a ranging request (Ranging Request), and the ONU needs to transmit the Serial_Number and Power_Mode_ONU information to respond.

The ONU may assemble the above two PLOAM messages in the way as described in the Example 1, and the assembled PLOAM message group is as shown in FIG. 12.

After receiving the PLOAM message group as shown in FIG. 10, the OLT judges whether the two CRCs of the PLOAMu message group are correct, and the OLT analyzes the PLOAMu messages corresponding to a correct CRC, and discards the PLOAMu messages corresponding to a wrong CRC.

When the two CRCs are both correct, the OLT judges the message type is "Serial_Number" according to the Message ID value 10000011 of the first PLOAMu message, and thus reads the sequence number information of the ONU; the OLT judges the message type is "Power_Mode_ONU" according to the Message ID value 10000000 of the second PLOAMu message, and thus reads the transmitting optical power level mode of the ONU.

The above content illustrates that the ONU assembles the above two PLOAMu messages in the way as described in the Example one, and the ONU may also assemble the Serial_Number and the Power_Mode_ONU in the way as described in the Example three. The assembled PLOAM message group is as shown in FIG. 13.

After receiving the PLOAM message group as shown in FIG. 13, the OLT judges whether the two CRCs of the PLOAMu message group are correct, and analyzes the PLOAMu messages corresponding to a correct CRC, and discards the PLOAMu messages corresponding to a wrong CRC.

When the two CRCs are both correct, the OLT judges the message type is "Serial_Number" according to the Message ID value 10000011 of the first PLOAMu message, and thus reads the sequence number information of the ONU; the OLT judges the message type is "Power_Mode_ONU" according to the Message ID value 10000000 of the second PLOAMu message, and thus reads the transmitting optical power level mode of the ONU.

In conclusion, by means of the division technology for PLOAM information, a PLOAM message carrying a plurality of kinds of information is divided into new PLOAM messages carrying only a single kind of information, and then a plurality of new PLOAM information are reassembled into a PLOAM message group selectively as needed to transmit. This transmission method of the PLOAM message is flexible and avoids the transmission of useless information. For example, in the ONU ranging process, the OLT only needs the ONU to transmit the Serial_Number and Power_Mode_ONU information and does not need it to transmit the Random_Delay_ONU information. Thus, in this Example, when the OLT transmits the Ranging-Request, the ONU only transmits the divided Serial_Number and Power_Mode_ONU information to respond and does not transmit the Random_Delay_ONU information again.

3. When the ONU is in the ranging phase, if the OLT requires the ONU to transmit the Serial Number information and the password information (Password message) at a time, the ONU may assemble the above Serial_Number message and the Password message which carry only a single kind of information according to the assembling way in the Example one to transmit to the OLT. The assembled message is as shown in FIG. 14.

The operations performed by the OLT when receiving the PLOAMu message group composed of two PLOAMu messages shown in the FIG. 14 will be analyzed below.

After receiving the PLOAM message group as shown in FIG. 14, the OLT judges whether the two CRCs in the PLOAMu message group are correct, and the OLT analyzes the PLOAMu message corresponding to a correct CRC, and discards the PLOAMu message corresponding to a wrong CRC.

When the two CRCs of the PLOAMu message group are both correct, the OLT begins to analyze the PLOAMu message group. The ONU-ID in the PLOAMu message group indicates the ONU initiating the message. The value of the first Message ID of the PLOAMu message group is 00000001, indicating that the PLOAMd message is used for the ONU to transmit the Serial Number to the OLT, and the first Data is the Serial Number of the ONU. The value of the second Message ID is 00000010, indicating that the PLOAMd message is used for the ONU to transmit the Password to the OLT, and the second Data is the Password of the ONU.

In this Example, when the OLT needs only the Serial Number information of the ONU, the above Serial_Number message carries only the Serial Number and the two kinds of information of the random time delay of the ONU when transmitting the message and the transmitting optical power level mode of the ONU in the Serial_Number_ONU are removed, improving the efficiency of the PLOAMd message transmission.

The above content describes that the ONU assembles the Serial_Number and the Password message in the way as described in the Example one, and the Serial_Number and the Password message may be also assembled in other ways. The OLT may also change the assembling sequence of the above PLOAM messages as needed. The length of the PLOAM message group in the Example is fixed, but the length of the PLOAM message group may vary. Each PLOAM message in the Example comprises the ONU-ID, the Message ID, the Data domain and the CRC, and the PLOAM message group may increase or decrease the content comprised.

EXAMPLE FIVE

The Example illustrates the division of the upstream overhead (Upstream_Overhead) message implemented by the method in the invention.

The Upstream_Overhead message in the GPON carries 6 kinds of information, the format of which is as shown in Table 5.

TABLE 5

Upstream_Overhead message format

| Byte number | Content | Description |
|---|---|---|
| 1 | 11111111 | The broadcast message transmitted to all the ONUs |
| 2 | 00000001 | Indicating that the message type is "Upstream_Overhead" |
| 3 | ggggggggg | ggggggggg = the number of guard bits |
| 4 | xxxxxxxx | xxxxxxxx = preamble bit of the type 1 |
| 5 | yyyyyyyy | yyyyyyyy = preamble bit of the type 2 |
| 6 | cccccccc | cccccccc = preamble bit mode used for the type 3 |
| 7 | bbbbbbbb | Used for the programmable data in the delimiter of the first byte |
| 8 | bbbbbbbb | The programmable data in the delimiter of the second byte |
| 9 | bbbbbbbb | The programmable data in the delimiter of the thrid byte |
| 10 | xxemsspp | xx = reserved<br>e = state of the pre-equalization mechanism: "0" = no pre-equalization time delay; "1" = use the following pre-equalization time delay<br>m = 0<br>ss = the maximum number of times for the extra allowed transmitting of the SN-transmissions (sequence number transmission information) to respond to the same SN-request. For example, ss = 10 indicates that the ONU can transmit 3 times of SN-transmissions to respond to the same SN-request.<br>Defaulted transmitting optical power level mode of the ONU<br>pp = "00"-mode 0: normal<br>pp = "01"-mode 1: normal-3 dB<br>pp = "10"-mode 2: normal-6 dB<br>pp = "11"-reserved |
| 11 | dddddddd | The MSB of preassigned equalization time delay (taking 32 bytes as a unit) |
| 12 | dddddddd | The LSB of preassigned equalization time delay (taking 32 bytes as a unit) |

As shown in Table 5, the Upstream_Overhead message carries six parts of information, namely, the number of guard bits, the preamble bit, the delimiter, pre-equalization time delay, the maximum number of times for the extral allowed transmitting of the transmission sequence number (SN-transmissions) to respond to the same sequence number request (SN-request) and the defaulted transmitting optical power level mode of the ONU respectively. In this example, the OLT divides the Upstream_Overhead message into six new PLOAM messages, each of which carries only a kind of information with a single function. Wherein, the PLOAM message carrying the information of the number of the guard bits is called as a guard bit message (Guard_Bit_Message); the PLOAM message carrying the preamble bit is called as a preamble bit message (Preamble_Bit_Message); the PLOAM message carrying the delimiter is called as a delimiter bit message (Delimiter_Bit_Message); the PLOAM message carrying the pre-equalization time delay is called as a pre-equalization delay message (Pre-assigned_delay_Message); the PLOAM message carrying the maximum number of times for the extral allowed transmitting of the SN-transmissions to respond to the same SN-request is called as a SN retransmittion times message (Extra_SN-transmissions_Times_Message); the PLOAM message carrying the defaulted transmitting optical power level mode of the ONU is called as an optical power mode of the ONU (Power_Mode_ONU). The formats of the six new PLOAM messages are as shown in Table 6, Table 7, Table 8, Table 9, Table 10 and Table 11. The values of the Message IDs in the Table 6, Table 7, Table 8, Table 9, Table 10 and Table 11 are only provided in the invention as an instance, and other values may be also set as needed.

TABLE 6

Guard_Bit_Message message format

| Byte number | Content | Description |
|---|---|---|
| 1 | 11111111 | The broadcast message transmitted to all the ONUs |
| 2 | 10000001 | Indicating that the message type is "Guard_Bit_Message" |
| 3 | gggggggg | gggggggg = the number of guard bits |

TABLE 7

Preamble_Bit_Message message format

| Byte number | Content | Description |
|---|---|---|
| 1 | 11111111 | The broadcast message transmitted to all the ONUs |
| 2 | 10000010 | Indicating that the message type is "Preamble_Bit_Message" |
| 3 | xxxxxxxx | xxxxxxxx = the preamble bit of the type 1 |
| 4 | yyyyyyyy | yyyyyyyy = the preamble bit of the type 2 |
| 5 | cccccccc | cccccccc = used for the preamble bit mode of the type 3 |

TABLE 8

Delimiter_Bit_Message message format

| Byte number | Content | Description |
|---|---|---|
| 1 | 11111111 | The broadcast message transmitted to all the ONUs |
| 2 | 10000100 | Indicating that the message type is "Delimiter_Bit_Message" |
| 4 | bbbbbbbb | Used for the programmable data in the delimiter of the first byte |
| 5 | bbbbbbbb | The programmable data in the delimiter of the second byte |
| 6 | bbbbbbbb | The programmable data in the delimiter of the third byte |

TABLE 9

Pre-assigned_delay_Message message format

| Byte number | Content | Description |
|---|---|---|
| 1 | 11111111 | The broadcast message transmitted to all the ONUs |
| 2 | 10001000 | Indicating that the message type is "Pre-assigned_delay_Message" |
| 3 | dddddddd | The MSB for the pre-assigned time delay (taking 32 bytes as a unit) |
| 4 | dddddddd | The LSB for the pre-assigned time delay (taking 32 bytes as a unit) |

TABLE 10

Extra_SN-transmissions_Times_Message message format

| Byte number | Content | Description |
|---|---|---|
| 1 | 11111111 | The broadcast message transmitted to all the ONUs |
| 2 | 10001000 | Indicating that the message type is "Extra_SN-transmissions_Times_Message" |
| 3 | xxxxssyy | xxxx = reserved<br>ss = the maximum number of times for the extra allowed transmitting of the SN-transmissions to respond to the same SN-request (For example, ss = 10 indicates that the ONU can transmit 3 times of SN-transmissions to respond to the same SN-request).<br>Defaulted transmitting optical power level mode of the ONU<br>yy = reserved |

TABLE 11

Power_Mode_ONU message format

| Byte number | Content | Description |
|---|---|---|
| 1 | 11111111 or ONU-ID | No ONU-ID assigned<br>If the ONU-ID is assigned to the ONU |
| 2 | 10000000 | Indicating that the message type is "Power_Mode_ONU" |
| 3 | XXXXXXTT | XXXXXX = 000000<br>TT = the transmitting optical power level mode of the ONU<br>TT = 00: low power<br>TT = 01: middle power<br>TT = 10: high power<br>TT = 11: reserved |

The OLT assembles regularly the Guard_Bit_Message, Preamble_Bit_Message, Delimiter_Bit_Message, Pre-assigned_delay_Message, Extra_SN-transmissions_Times_Message and Power_Mode_ONU into one PLOAM message group, which is used for the activation of the ONU, to transmit to the ONU. The OLT may assemble the above six PLOAM messages according to the assembling way in the Example one, and the assembled PLOAM message group is as shown in FIG. 15.

After receiving the PLOAM message group shown in FIG. 15, an ONU having not registered to activate judges whether the six CRCs of the PLOAMu message group are correct. The ONU analyzes a PLOAMu message corresponding to a correct CRC, and discards a PLOAMu message corresponding to a wrong CRC.

When all the six CRCs are correct, the ONU analyzes the six PLOAMu messages respectively. The ONU-ID value of the PLOAMu message group is 11111111, indicating that the broadcast message transmitted to all the ONUs. The value of the first Message ID of the PLOAMu message group is 10000001, indicating that the message type is "Guard_Bit_Message", so the ONU reads and stores the number of guard bits of the corresponding Data domain; the value of the second Message ID is 10000010, indicating that the message type is "Preamble_Bit_Message", so the ONU reads and stores the value of the preamble bit of the Data domain; the value of the third Message ID is 10000100, indicating that the message type is "Delimiter_Bit_Message", so the ONU reads and stores the delimiter value of the corresponding Data domain; the value of the fourth Message ID is 10001000, indicating that the message type is "Pre-assigned_delay_Message", so the ONU reads and stores the pre-assigned equalization time delay value of the corresponding Data domain; the value of the fifth Message ID is 10010000, indicating that the message type is "Extra_SN-transmissions_Times_Message", so the ONU reads and stores the maximum number of times of the corresponding Data domain for the extra allowed transmitting of the SN-transmissions to respond to the same SN-request; the value of the sixth Message ID is 10000000, indicating that the message type is "Power_Mode_ONU", so the ONU reads the transmitting optical power level mode of the ONU of the corresponding Data domain, and configures the transmitting optical power level of itself.

The above message group comprises a Pre-assigned_delay_Message message, and the OLT may also exclude the Pre-assigned_delay_Message message in the above message group as needed, which embodies the flexibility of assembling the PLOAM messages carrying a single kind of information. In the above PLOAM message group, whether the Pre-assigned_delay_Message information is comprised has been embodied in the PLOAM message (the Upstream_Overhead message may not comprise the Pre-assigned_delay information, but its field is still retained and indicated by the bit e in the $10^{th}$ byte in the Table 5), and the information indicating whether the pre-equalization time delay that is comprised in the original Upstream_Overhead message becomes redundant information, so the part of information has been removed from the Pre-assigned_delay_Message message in this Example, making the format of the Pre-assigned_delay_Message message simpler.

The above content describes that the OLT assembles the above six kinds of new PLOAM messages in the way as described in the Example one, and the OLT may also assemble the above six kinds of new PLOAM messages in other ways; the above content provides the sequence of the OLT assembling the above six kinds of new PLOAM messages, and the OLT may also change the assembling sequence of the above PLOAM messages as needed. In this Example, each PLOAM message comprises the ONU-ID, Message ID, Data domain and CRC, and the PLOAM message group may also increase or decrease the content comprised.

EXAMPLE SIX

This Example illustrates the division of the bandwidth identification assignment (Assign_Alloc_ID) message implemented by the method in the invention.

The Assign_Alloc-ID message in the GPON is as shown in Table 12. The Assign_Alloc_ID message carries two parts of information, namely, the ONU-ID of the ONU assigned by the OLT and the sequence number information of the ONU respectively. In this Example, the OLT, as the transmitter, divides the Assign_Alloc_ID message into two new PLOAM messages, each of which carries only part of the information with a single function. Wherein, the PLOAM message carrying the sequence number information of the ONU is called as Serial_Number, whose message format is as shown in Table 2; the PLOAM message carrying the ONU-ID information of the ONU assigned by the OLT is called as an ONU identification assignment message (Assign_ONU-ID), as shown in Table 13. The values of the Message ID in the Table 13 are only provided in the invention as an instance, and other values may be also set as needed.

The Assign_Alloc-ID message format in the GPON is shown in Table 12.

TABLE 12

Assign_ONU-ID message format

| Byte number | Content | Description |
|---|---|---|
| 1 | 11111111 | The broadcast message transmitted to all the ONUs |
| 2 | 00000011 | Indicating that the message type is "Assign_ONU-ID" |
| 3 | pppppppp | ONU-ID |
| 4 | abcdefgh | The first byte of the sequence number |
| 5-10 | ... | |
| 11 | stuvwxyz | The eighth byte of the sequence number |
| 12 | Unregulated | Reserved |

TABLE 13

Assign_ONU-ID message format

| Byte number | Content | Description |
|---|---|---|
| 1 | 11111111 | The broadcast message transmitted to all the ONUs |
| 2 | 10000011 | Indicating that the message type is "ONU-ID" |
| 3 | pppppppp | ONU-ID |

EXAMPLE SEVEN

The Example illustrates the division of the disabled sequence number (Disable_serial_number) message implemented by the method in the invention.

The Disable_serial_number message format in the GPON is as shown in Table 14. The Disable_serial_number message carries two parts of information, namely, the instructions assigned to the ONU by the OLT and the sequence number information of the ONU respectively. In the Example, the OLT divides the Disable_serial_number message into two new PLOAM messages, each of which carries only part of the information with a single function. Wherein, the PLOAM message carrying the sequence number information of the ONU is called as Serial_Number, as shown in Table 2; the PLOAM message carrying the instructions assigned to the ONU by the OLT is called as a Disable_serial_number_ONU (disabled ONU sequence number) message, as shown in Table 15. The values of the Message ID in the Table 15 are only provided in the invention as an instance, and other values may be also set as needed.

TABLE 14

Disable_serial_number message format

| Byte number | Content | Description |
|---|---|---|
| 1 | 11111111 | The broadcast message transmitted to all the ONUs |
| 2 | 00000110 | Indicating that the message type is "Disable_Serial_Number" |
| 3 | Disable/Enable | 0xFF: disable the ONU with the sequence number to occupy an upstream resource<br>0x0F: all the ONUs disabled to occupy an upstream resource can participate in ranging. The contents from the 4th byte to the 11th are not related<br>0x00: the ONU with the sequence number can participate in the ranging |
| 4 | abcdefgh | The first byte of the sequence number |
| 5-10 | ... | |
| 11 | stuvwxyz | The eighth byte of the sequence number |
| 12 | unregulated | Reserved |

TABLE 15

Disable_serial_number_ONU message format

| Byte number | Content | Description |
|---|---|---|
| 1 | 11111111 | The broadcast message transmitted to all the ONUs |
| 2 | 10000110 | Indicating that the message type is "Disable_Serial_Number_ONU" |
| 3 | Disable/Enable | 0xFF: disable the ONU with the sequence number to occupy an upstream resource<br>0x0F: all the ONUs disabled to occupy an upstream resource can participate in ranging. The contents from the 4th byte to the 11th are not related<br>0x00: the ONU with the sequence number can participate in the ranging |

Other PLOAM messages in the GPON may be divided in the above ways, i.e. a PLOAM message carrying two or more kinds of messages may be divided into two or more PLOAM messages, each of which carries only a single kind of message, which will not be repeated here. The divided PLOAM messages, each of which carries only one kind of message, may be assembled to transmit in the ways as described in the Examples one, two and three as needed.

The division results may be different depending on the difference of the determined functions.

For example, in the above Example four, a message, Serial Number message for carry the sequence number information of the ONU, is divided from the ONU sequence number message. If the division is performed according to the function of carrying the Vendor_ID (VID_ID) and the function of carrying the specific Vendor sequence number (VSSN), the Serial Number message may be further divided into two new PLOAM messages, i.e. the ONU sequence number message may be divided into four new PLOAM messages.

The Serial_Number message is divided into two PLOAM messages, which respectively carry VID_ID and VSSN, wherein, the PLOAM message carrying the VID_ID information is called as Serial_Number_Vendor, as shown in Table 16; the PLOAM message carrying the VSSN information is called as Serial_Number_Vendor_VSSN, as shown in Table 17.

The two kinds of PLOAM messages after the division may be assembled to transmit in the ways as described in the Examples one, two and three as needed, and may be also assembled to transmit with other new PLOAM messages. The values of the Message ID in the Table 16 and Table 17 are only provided in the invention as an instance, and other values may be also configured as needed.

TABLE 16

Serial_Number_Vendor message format

| Byte number | Content | Description |
|---|---|---|
| 1 | 11111111 or ONU-ID | No ONU-ID assigned<br>If the ONU-ID is assigned to the ONU |
| 2 | 11000011 | Indicating that the message type is "Serial_Number_Vendor" |
| 3 | VID1 | The first byte of the Vendor_ID |
| 4 | VID2 | The second byte of the Vendor_ID |
| 5 | VID3 | The third byte of the Vendor_ID |
| 6 | VID4 | The fourth byte of the Vendor_ID |

TABLE 17

Serial_Number_VSSN message format

| Byte number | Content | Description |
|---|---|---|
| 1 | 11111111 or ONU-ID | No ONU-ID assigned<br>If the ONU-ID is assigned to the ONU |
| 2 | 11100011 | Indicating that the message type is "Serial_Number_VSSN" |
| 3 | VSSN1 | The first byte of the sequence number of the specific Vendor |
| 4 | VSSN2 | The second byte of the sequence number of the specific Vendor |
| 5 | VSSN3 | The third byte of the sequence number of the specific Vendor |
| 6 | VSSN4 | The fourth byte of the sequence number of the specific Vendor |

Of course, the invention may further have other various examples, and those skilled in the art may make various modifications and variations without deviating from the spirit and the substance of the invention, but the modifications and variations should all fall into the protection scope of the accompanying claims of the invention.

For example, the invention may be also suitable for the XGPON system based on the GPON, and only the format and length of the PLOAM message may vary with respect to the GPON system. For example, in the XGPON system, an upstream PLOAM message may not comprise the ONU-ID, while a Sequence Number field may be added to a downstream PLOAM message.

Those skilled in the art should appreciate that all or part of the steps in the above methods can be completed by instructing related hardware through programs, which may be stored in a computer readable storage medium, such as a read only memory, a disk or an optical disk and so on. Preferably, all or part of the steps in the above Examples may be also implemented by using one or more integrated circuits. Correspondingly, the modules/units in the above Examples may be implemented in the form of hardware, and may be also implemented in the form of software functional modules. The invention is not limited to any combination of hardware and software in any specific form.

Industrial Applicabilty

By using the method of the invention, the invention improves the efficiency of the PLOAM message transmission, avoids bandwidth waste, and simultaneously improves the flexibility and timeliness of the PLOAM message transmission between the OLT and the ONU.

What is claimed is:

1. A transmission method for a physical layer operations, administration and maintenance (PLOAM) message in a passive optical network, the method comprising:
   a transmitter dividing a PLOAM message to generate more than two new PLOAM messages, each of which comprises at least a message identification (Message ID) field; and
   the transmitter transmitting the new PLOAM messages identified with Message IDs.

2. The method according to claim 1, wherein:
   the new PLOAM messages generated further comprise an optical network unit identification (ONU ID) field and/or a data field.

3. The method according to claim 2, wherein:
   the data field in the new PLOAM message is null.

4. The method according to claim 1, wherein, in the step of the transmitter transmitting the new PLOAM messages identified with Message IDs, the transmitter transmits the new PLOAM messages in any one of following ways:
  assembling n arbitrary new PLOAM messages into one PLOAM message group to transmit, n≥1 and n is an integer;
  assembling part of fields of n new PLOAM messages into one PLOAM message group to transmit;
  assembling n new PLOAM messages with an undivided PLOAM message into one PLOAM message group to transmit;
  assembling part of fields of n new PLOAM messages with an undivided PLOAM message into one PLOAM message group to transmit;
  wherein, in above ways, the n new PLOAM messages are from one PLOAM message or a plurality of PLOAM messages.

5. The method according to claim 4, wherein:
there are t ONU IDs in the assembled PLOAM message group, 0≤t≤n, and t is an integer.

6. The method according to claim 4, wherein:
the PLOAM message group carries a cyclic redundancy check (CRC), wherein, each new PLOAM message is corresponding to one CRC, or a plurality of new PLOAM messages share one CRC.

7. The method according to claim 6, wherein, the transmitter is an optical line terminal (OLT);
  after the step of the transmitter transmitting the new PLOAM messages identified with Message IDs, the method further comprises:
  after receiving the PLOAM message group, an optical network unit (ONU), which is as a receiver, analyzing the CRC from the PLOAM message group firstly, analyzing an ONU ID from a new PLOAM message corresponding to a correct CRC; and
  when the ONU ID indicates that the new PLOAM message is a PLOAM message which should be received by the ONU itself, the ONU continuing to read the Message ID in the new PLOAM message.

8. The method according to claim 7, the method further comprising:
  after reading the Message ID, the receiver continuing to read a data field to obtain message content corresponding to the Message ID.

9. The method according to claim 6, wherein, the transmitter is an ONU;
  after the step of the transmitter transmitting the new PLOAM messages identified with Message IDs, the method further comprises:
  after receiving the PLOAM message group, an OLT, which is as a receiver, analyzing the CRC from the PLOAM message group firstly, analyzing an ONU ID from a new PLOAM message corresponding to a correct CRC, knowing the ONU which transmits the PLOAM message group; or analyzing an ONU ID from an upstream burst frame in which the PLOAM message group is, knowing the ONU which transmits the PLOAM message group; and
  the OLT continuing to read a Message ID of the new PLOAM message.

10. The method according to claim 9, the method further comprising:
  after reading the Message ID, the receiver continuing to read a data field to obtain message content corresponding to the Message ID.

11. The method according to claim 4, wherein:
the assembled PLOAM message group occupies N*X bytes, wherein, N≥1 and N is an integer, X is a length of a PLOAM message format defined in a standard.

12. The method according to claim 1, wherein:
when the divided message is an ONU sequence number message, the new PLOAM messages generated after the transmitter divides the ONU sequence number message comprise:
a new PLOAM message carrying sequence number information of the ONU; a new PLOAM message carrying a random time delay of the ONU; a new PLOAM message carrying a transmitting optical power level mode of the ONU; or
a new PLOAM message carrying vendor identification information; a new PLOAM message carrying a sequence number information of a specific vendor; a new PLOAM message carrying a random time delay of the ONU; a new PLOAM message carrying a transmitting optical power level mode of the ONU.

13. The method according to claim 1, wherein:
when the divided PLOAM message is an upstream overhead message, the new PLOAM messages generated after the transmitter divides the upstream overhead message comprise:
a new PLOAM message carrying information of a number of guard bits; a new PLOAM message carrying a preamble; a new PLOAM message carrying a delimiter; a new PLOAM information carrying a pre-equalization time delay; a new PLOAM information carrying a maximum number of times for extra allowed transmitting of a sequence number transmission message to respond to an identical sequence number request; a new PLOAM information carrying a defaulted transmitting optical power level mode of an ONU.

14. The method according to claim 1, wherein:
when the divided PLOAM message is a bandwidth identification assignment message, the new PLOAM messages generated after the transmitter divides the bandwidth identification assignment message comprise:
a new PLOAM message carrying sequence number information of an ONU; a new PLOAM message carrying ONU-ID information assigned to an ONU by an OLT.

15. The method according to claim 1, wherein:
when the divided PLOAM message is a disabled sequence number message, the new PLOAM messages generated after the transmitter divides the disabled sequence number message comprise:
a new PLOAM message carrying sequence number information of an ONU; a new PLOAM message carrying an instruction transmitted from an OLT to an ONU.

16. An assembling method for a physical layer operations, administration and maintenance (PLOAM) message in a passive optical network, the method comprising:
a transmitter assembling a plurality of PLOAM messages into one PLOAM message group to transmit.

17. The method according to claim 16, wherein:
the assembled PLOAM message group occupies N*X bytes, wherein, N≥1 and N is an integer, X is a length of a PLOAM message format defined in a standard.

18. The method according to claim 16, wherein, the a plurality of PLOAM messages comprise a new PLOAM message after a division and/or an undivided PLOAM message, the new PLOAM message comprises at least a message identification (Message ID) field, the assembling way is one of following ways:
  assembling n arbitrary new PLOAM messages into one PLOAM message group to transmit, n≥1 and n is an integer;
  assembling part of fields of n new PLOAM messages into one PLOAM message group to transmit;
  assembling n new PLOAM messages with an undivided PLOAM message into one PLOAM message group to transmit;
  assembling part of fields of n new PLOAM messages with an undivided PLOAM message into one PLOAM message group to transmit;
  assembling n undivided PLOAM messages into one PLOAM message group to transmit;
  wherein, in above ways, the n new PLOAM messages are from one PLOAM message or a plurality of PLOAM messages.

19. The method according to claim 18, wherein:
there are t optical network unit identifications (ONU IDs) in the assembled PLOAM message group, 0≤t≤n, and t is an integer.

20. The method according to claim 19, wherein:
the PLOAM message group carries a cyclic redundancy check (CRC), wherein, each new PLOAM message is corresponding to one CRC, or a plurality of new PLOAM messages share one CRC.

21. The method according to claim 18, wherein:
the PLOAM message group carries a cyclic redundancy check (CRC), wherein, each new PLOAM message is corresponding to one CRC, or a plurality of new PLOAM messages share one CRC.

22. A transmission device for a physical layer operations, administration and maintenance (PLOAM) message in a passive optical network, the device comprising:
  a message dividing module, which is configured to: divide a PLOAM message to generate more than two new PLOAM messages, each of which comprises at least a message identification (Message ID) field; and
  a message transmitting module, which is configured to: transmit the new PLOAM messages identified with Message IDs.

* * * * *